United States Patent
Krumm et al.

[11] Patent Number: 6,105,109
[45] Date of Patent: Aug. 15, 2000

[54] SYSTEM SPEED LOADING OF A WRITABLE CACHE CODE ARRAY

[75] Inventors: Barry Watson Krumm; Charles Franklin Webb, both of Poughkeepsie; Timothy John Slegel, Staatsburg; Mark Steven Farrell, Pleasant Valley; Yuen Hung Chan, Poughkeepsie, all of N.Y.

[73] Assignee: International Business Machines Corporation, Armonk, N.Y.

[21] Appl. No.: 09/026,327

[22] Filed: Feb. 19, 1998

[51] Int. Cl.[7] .............................. G06F 13/00; G06F 9/28
[52] U.S. Cl. ........................... 711/122; 712/217; 711/134
[58] Field of Search .................................. 711/122, 133, 711/134; 712/217, 218, 227, 245

[56] References Cited

U.S. PATENT DOCUMENTS

| | | | |
|---|---|---|---|
| 5,790,844 | 8/1998 | Webb et al. | 712/227 |
| 5,802,359 | 9/1998 | Webb et al. | 712/227 |
| 5,822,558 | 10/1998 | Tran | 712/213 |

OTHER PUBLICATIONS

D.C. Wong et al., "A Software Approach To Avoiding Spatial Cache Collisions In Parallel Processor Systems", IEEE Transactions on Parallel and Distributed Systems, vol. 9, pp. 601–608, Jun. 1998.

"A High–Frequency Custom CMOS S/390 Microprocessor", Charles Webb et al., IBM Journal Research and Development, pp. 241–246, 1997.

"IBM's S/390 G5 Microprocessor Design", Slegel et al., IEEE Micro, pp. 12–23, 1999.

*Primary Examiner*—Do Hyun Yoo
*Assistant Examiner*—Pierre-Michel Bataille
*Attorney, Agent, or Firm*—Lynn L. Augspurger

[57] ABSTRACT

SMP computers systems can add to the first level cache a fill mode latch and achieve straightforward, high-performance loading of a writable cache code array that is part of a hierarchical cache structure. A new code array's write control elements include a control latch called "fill mode" for the BCE controls which when fill mode is active, then a disable is also active, since reads of the code array may not give accurate data when the array is not yet filled-up/fully valid. New mode follows the sequential steps which process code by:

a) purge the cache array; then
    b) disable the code array; then
    c) turn on fill mode with a buffer control element fill mode latch; and then process
    d) code increments once through a range of line addresses, where the range is at least as wide as the range(s) specified in the code array's lookup mechanism.
    e) turn off fill mode; then
    f) purge the cache array again: and then
    g) enable the code array (turn off the code array disable bit).
    h) resume normal operation to end the sequence.

6 Claims, 3 Drawing Sheets ion is related to SMP computers and computer systems and and in particular to straightforward, high-performance loading of a writable cache code array that is part of a hierarchical cache structure.

SYSTEM SPEED LOADING OF A WRITABLE CACHE CODE ARRAY

FIELD OF THE INVENTION

This invention is related to SMP computers and computer systems and and in particular to straightforward, high-performance loading of a writable cache code array that is part of a hierarchical cache structure.

BACKGROUND OF THE INVENTION

The IBM S/390 (both marks are registered trademarks of International Business Machines Corporation) has developed and used millicode in the hierarchical cache structure using a read only storage structure for millicode in an SMP environment. In this environment it would be desireable to load millicode by scanning, special instructions, or normal instructions into a writeable code array (not ROS). As illustrated by the IBM S/390 G4 CMOS, the state of the art has provided for the use of highly priveleged subroutines in 390-like code, which are called milli-code, to provide new processors with the capabilities it needs without adding excessive complexity. Two previous solutions have included 1) loading the code array by scanning, and/or 2) loading the code array by using some variation of store instructions. When the previous solution used normal store instructions, and the code array's data is read-only, then there was a forced reduction in performance by generating unnecessary exclusive fetches/stores/castouts through the storage hierarchy. But when special store instructions were employed, design complexity was added to process these unique requests. Furthermore, some of these solutions, such as scanning, have been frustratingly slow.

In this connection, it should be explained that IBM 1997 G4 machines use a ROS (read-only storage) array. A ROS is, by definition, not writable, and it can not be loaded using scanning, store instructions, special store instructions, etc. The "code" or "contents" of ROS are hardwired in the circuitry. A ROS has no loading function. A read-only storage (ROS) structure has the drawback that changes to its code/contents require physical change to the chip, which is expensive and slow. While IBM's earlier G3 machines which were CMOS machines used microcode for some routines, the G4 CMOS machine introduced in 1997 was the first to use millicode.

Even earlier IBM S/390 machines which were bipolar did use a writable code array, although their code array was not part of the bce/L1 cache structure. Their code array could be loaded using scanning, store instructions, special store instructions, etc. (one of those methods). Earlier 390 bipolar machines also used microcode and not millicode.

Once we have provided during development of our invention a writable code array (which by definition is not a ROS) for our new machines a writeable code array which is part of our bce/L1 cache structure, we could have loaded it using scanning, store instructions, or special store instructions, but instead after making our invention prefer the idea being described.

SUMMARY OF THE INVENTION

We discovered how to load the writable internal code array that logically and physically functions as an extension of the cache, such as millicode, or service code or i/o code, without change in the basic code array structure and with very little extra logic to provide a code array mechanism that shares as much of the existing cache array logic and code array read logic as possible. The preferred embodiment described herein minimized chip area and design complexity and provides for system speed loads with a fill mode which would not function in a ROS environment, but is preferred for use in the preferred method of loading the writable internal code array. For this purpose we have provided a fill mode latch (fml) which will not work with ROS, but instead works with a writable internal code array.

The loading of the writeable code array can now provide a straightforward and high-performance load without the need to use special store instructions which we consider to be complex rather than straightforward, nor store instructions which can allow system speed load but is not as as high- performance, because they take more system cycles to do castouts, nor, scanning which is not high-performance and can be frustratingly slow. Instead, the changes from ROS to the use of a writable code array, and the our provision of a fill mode latch allows use of our high performance process for loading an array with millicode, or service code or i/o code, without change in the basic code array.

These and other improvements are set forth in the following detailed description. For a better understanding of the invention with advantages and features, refer to the description and to the drawings.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Figure 1:
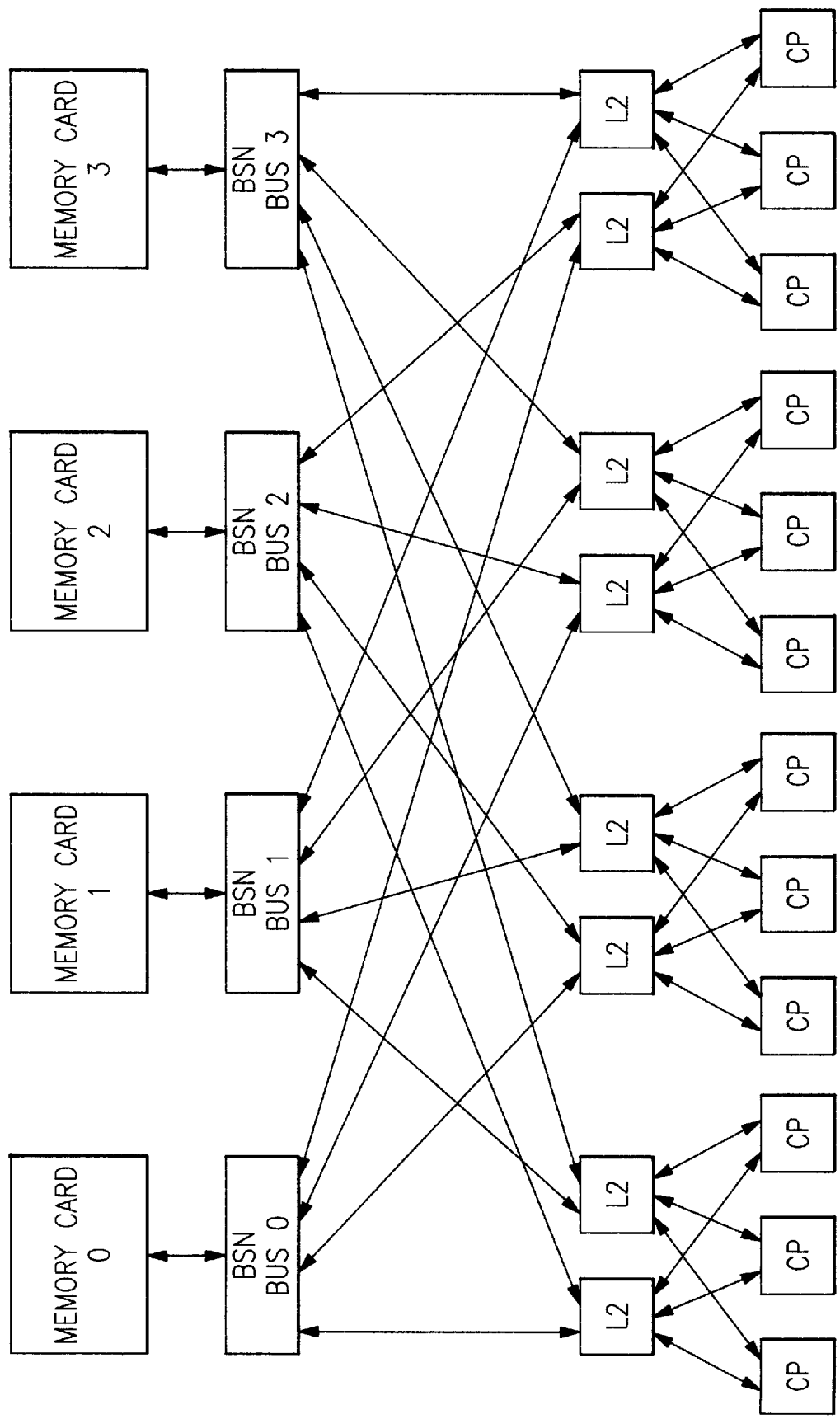
FIG. 1 shows schematically an overview of IBM's recent mainframe CMOS series which have been called the S/390 fourth generation or G4 with its memory hierarchy structure for these modern symmetrical multiprocessors (SMPs).

The S/390 (trademark of International Business Machines Corporation) machines have evolved from large bi-polar mainframes to powerful servers having the mainframe capability but founded with a CMOS environment. Recent series have been called the fourth generation or G4 illustrated by FIG. 1. The S/390 G4 memory hierarchy structure for these modern symmetrical multiprocessors (SMPs) uses a shared L2 cache chip where cache controls are on the same chip, and the shared cache has two chips clustered as the L2 cache pair with the entire memory address mapped across the pair of L2 cache chips, and these are interleaved across four memory cards 0,1,2,3 to maximize concurrent operation. The cache array is a six-way set-associative, dual inter-leave cache with directories on the chips dedicated to each system bus 0, 1, 2, 3. Each L2 chip itself has nonblocking switching to each attached CP of the SMP as well as to other system components. The independent cross point switches maintain the SMP performance and operate independently for each CP and BSN port and for each cache array, allowing up to five simultanteous transfers on the L2 cache chip data ports. Data buffers in the cache array minimize latency. Each CP chip has on board the L1 cache designed as a store through cache, meaning that altered data is also stored back to the L2 next level cache when the data is altered. The L2 however is a store-in. Data coherency between the Lis and L2s is maintained so that all lines contained in any L1 are also stored in that cluster's L2. The cache has ECC on both the cache and directory arrays. Error correction is in all cases done on the fly. This means that when uncorrectable errors are encountered, there must be system recovery. In addition, on the BSN chip there are L2.5 caches as the third level of the memory hierarchy located on each of the four logical BSN buses. These operate as a main store cache for frequently accessed, shared, read only data and as a store through cache. There are no superset or subset rules between L2 and L2.5 and L2.5 does not hold data that is more recent than the copy in either the L2 or main store. But also, the hierarchy which makes the L2 caches supersets of the L1 cache of the same cluster and means that the L1 line must also exist at the L2 level of the same cluster, but the reverse is not true normally, in that a line of data may exist in the L2 without existing in the L1 cache, except for a subset rule relating to what is called in the S/390 structure millicode. The S/390 millicode has included nonupdatable millicode which is kept in the L1 when not in the L2 in order to prevent certain deadlocks on the BSN bus from occuring. Coherency is maintained by use of the directory states that are defined for the first two levels of caches.

This structure is complex, as the architecture is complex and changes to be made to improve the system are difficult to achieve, let alone define. Indeed millicode itself was defined because conventional horizontal microcode was not feasible because of both chip area and cycle time. Millicode is code for highly priveledged subroutines formulated in 390-like code. In light of the memory hierarchy described and to have the processor run efficiently while it is in millicode without adding excessive complexity to the hardware, in the most advanced SMPs to date, the S/390 G4, millicode occupies space in the cache, particularly with added 32KB of read-only storage (ROS) where the mechanism for the preferred embodiment resides with a writeable code array (not ROS) in the BCE portion that allows for our provision of a new fill mode latch (fml) and has the L1 cache array of the CP illustrated by FIG. 2, which is the extension to the cache which contains frequently used milli-code routines. The structure used by G4 was developed and implemented by having, when a fetch is made from a portion of the memory hierarchy corresponding to the ROS to have the BCE part of the CP bring data out of the ROS rather than bringing that line into the cache. When instructions for which millicode is in ROS are detected when they are decoded, the appropriate ROS address is used. If there is an error in the ROS routine, in the G4 the erroneous routine could be patched with the millicode entry reverting to the default address for that opcode without affecting other ROS routines.

In the prior G4 machine, ROS was provided and the BCE buffer control element portion was not provided with a fill mode latch or the writable code array we now use which is provided with the preferred embodiment of the invention. It was possible, however, in a bipolar machine to load the code array with scanning or with a complex special store instruction or with the use of normal store instructions, but these had lower performance and/or more hardware design complexity due to unique operations or the necessity to generate exclusive fetches or stores or castouts throught the hierarchical storage. But with a desire to efficiently use as an extension of cache a writable code array for millicode in an SMP environment as described for the S/390, there is a need, especially when an error is detected, to obtain efficient loading of the writable code array.

Figure 3:
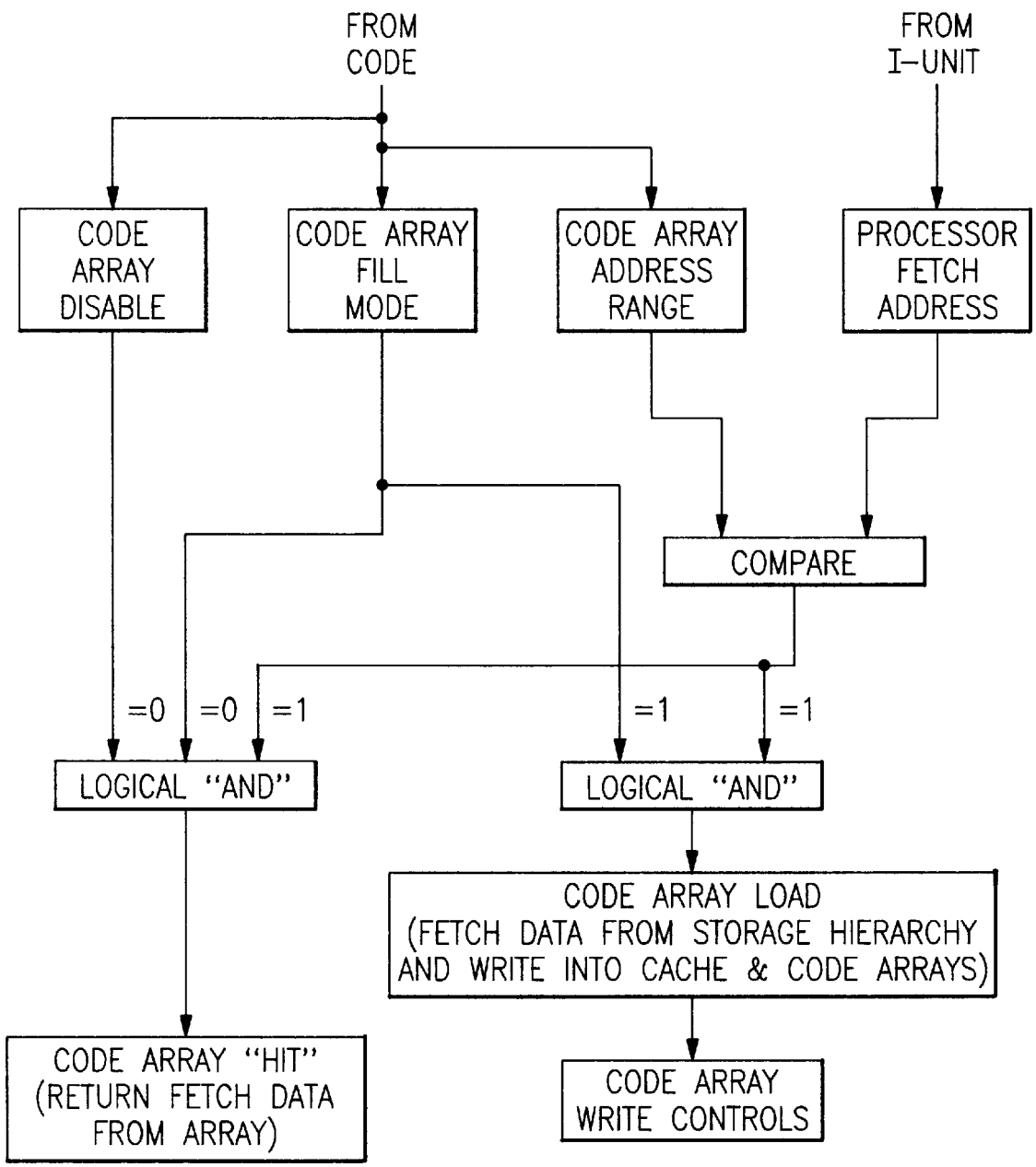
FIG. 3 illustrates the mechanism which employs a new sequence which allows internal code to be put in a writable internal code array in the BCE (the CPs buffer control element having the L1) that logically and physically functions as an extension of the cache in a way that enables internal code, such as millicode, service code, i/o code to be run at system speed instead of any lower scan speed as provided by this illustrated preferred embodiment.

FIG. 3 illustrates the mechanism for loading a writable internal code array such as the L1 cache array of the updated BCE with fill mode latch which provides a hierarchical memory portion for writable millicode, service code, i/o code that logically and physically functions as an extension of the cache, in a way that cleanly fits in with a base code array/cache design with very little extra logic.

Figure 2:
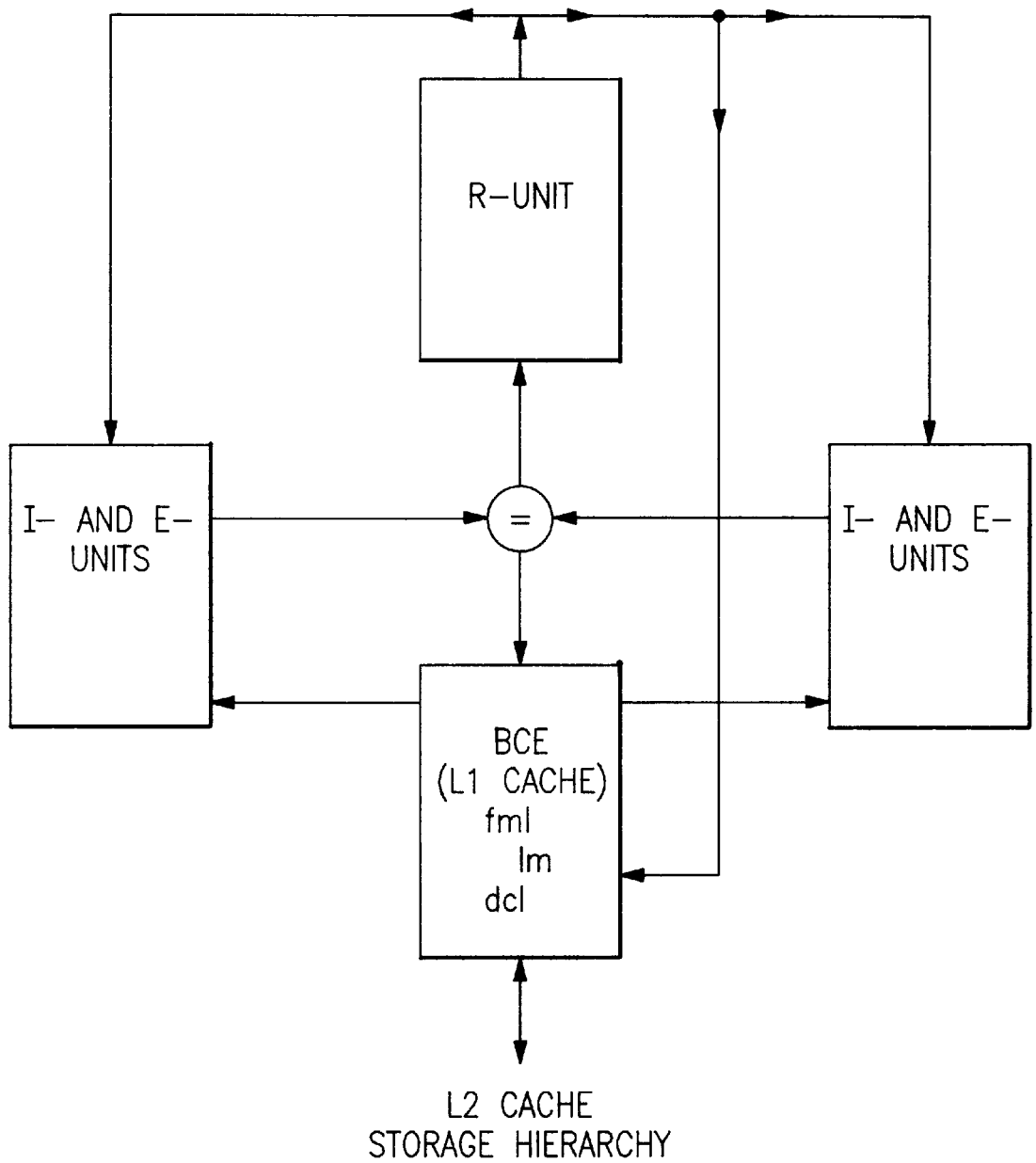
FIG. 2 illustrates a CP of the most advanced SMPs to date, the S/390 G4, where millicode occupies space in the cache, particularly with added 32KB of read-only storage (ROS) in the BCE portion (L1 cache) of the CP.

The preferred embodiment is a code array write mechanism for the buffer control element BCE of FIG. 2 that shares as much existing cache array logic and code array read logic as possible, to minimize design complexity and save chip area, and which includes our fill mode latch. The mechanism chosen is to load the code array by fetching lines of data from the storage hierarchy (next level of cache, normally L2, that's farther away from the cp), similar to how the cache itself is loaded for a cache miss. This mechanism assumes that the code array's data is contained in system storage and is organized with a granularity that is no finer than the same line granularity that the cache has. The code array shares most of its write address bus with the cache array, depending on the depth of these two arrays.

If we assume that the widths of the two arrays are identical, then the code array shares the cache's write data bus, including parity/ecc generation (assuming that the code array's parity/ecc scheme matches the cache array's parity/ecc scheme).

The code array's existing read logic will be described for the BCE of FIG. 2 before describing how the code array's new write controls work. The code array provided for the BCE and Level 1 cache has a disable control latch (dcl) that determines whether the code array can be used for a read access. This control latch also determines whether the code array's read data can be checked for good parity/ecc. One case that may set the disable control latch is if bad parity/ecc is detected from the code array.

The code array also has a lookup mechanism (lm) of some sort, that determines whether a given line of data is in the code array. This mechanism's relationship to the code array is similar to the cache directory's relationship to the cache array. Assume the lookup mechanism is an address range compare, and that the compare values are relatively static.

If the code array's disable latch is off, and a fetch request's address matches the code array's lookup mechanism, then we have a code array "hit", and data is returned from the code array to the requester.

Now when a cache purge capability exists, that causes the cache directory's valid bits to all be turned off. For the code array's new write controls, a new control latch called "fill mode" is added to the BCE controls. When fill mode is active, then disable is also active, since reads of the code array may not give accurate data when the array is not yet filled-up/fully valid.

When that new code is added to control filling of the code array, this new code in accordance with our preferred process does the following sequence. The sequential steps are:

a) purge the cache array; then b) disable the code array; then c) turn on fill mode with a buffer control element fill mode latch; and then the write control code process d) increments once through a range of line addresses, where the range is at least as wide as the range(s) specified in the code array's lookup mechanism.

In accordance with the preferred embodiment the new code causes the i-unit to issue one normal operand fetch for a single dw (doubleword) for each line.

The cache purge in step (a) along with the code array disable in step (b) guarantees that these fetches will not hit in the cache and not hit in the code array. So the cache's existing control logic causes line fetches to be issued to the storage hierarchy. And the existing control logic allows the data from the storage hierarchy to be written into the cache (although this cache data will end up being thrown away: see later (f) step).

The code array's existing lookup mechanism, logically AND'ed with fill mode, determines if the fetch to the storage hierarchy will be returning data that should be written into the code array (as well as the cache array). This is the same existing lookup mechanism that is logically AND'ed with "not disable" to determine whether there was a hit in the code array.

Now, when the data is to be written into the code array, then the code array is written in parallel with the cache array. The following steps are processed.

e) turn off fill mode; then f) purge the cache array again; and then g) enable the code array (turn off the code array disable bit).

Purging the cache array again prevents having the same line of data present in both the cache and the code array. This prevents a hit in the cache and code array at the same time (a case that may cause logic control and circuit implementation problems).

Finally, with the step of resuming normal operation, the sequence ends. Note that if a fetch request comes in that is within the code array range, a hit will occur in the code array (and a miss in the cache array), and the data will be returned to the requestor. This is the end of the code sequence.

Note that the only unique logic added to the design to support writing the code array is the "fill mode" function and the controls for its set / use within the BCE controls for the SMP system.

Systems having a processor, a memory and a bus coupling the two to additional computer systems elements (applicable to the S/390, but also applicable to SMPs and other kinds of systems not excluded below) which have cache(s) and internal code can use this invention as illustrated by the data flow of FIG. 3, showing the new mode mechanism in action which allows the writeable internal code array to be loaded while the system is in normal operation.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A method which allows a code array of a computer processor system having an instruction unit, execution unit and buffer control element to be written while the system is in normal operation, and having an internal code array storage having a code array lookup mechanism having a range of line addresses specified in the code array's lookup mechanism and an area for storing writeable system subroutines associated with said buffer control element a memory and a bus coupling the said two areas to additional computer systems elements as part of a hierarchical memory system which has at least two levels of memory including a cache array level and said memory, the method providing the steps of:

causing with write control code the computer system instruction unit to issue one normal operand fetch for a single dw (double word) for each line of said code array and causing data to be written into said code array; and when said write control code controls filling of the code array, said write control code sequentially a) purges the cache array; and then b) disables the code array; and then c) turns on a fill mode with a buffer control element fill mode latch; and then the write control code process d) increments once through a range of line addresses, where the range is at least as wide as any range(s) specified in the code array's lookup mechanism; and then said write control code:

e) turns off fill mode; and f) purges the cache array again; and then g) enables the code array.

2. The method according to claim 1 wherein purging the cache array again prevents having the same line of data present in both the cache and the code array.

3. The method according to claim 2 wherein purging the cache array again prevents a hit in the cache and code array at the same time.

4. The method according to claim 3 wherein the write control code process ends its sequence with a step of resuming normal operations.

5. The method according to claim 4 wherein the write control code control for the processor causes a hit to occur in the code array and a miss in the cache array if a fetch request comes in that is within the code array range and data to be returned to the requester.

6. The method according to claim 5 wherein when the write control code control fill mode is active, the code array's disable latch is also active, the active condition of said fill mode and said code array disable control latch being determined by the setting of a fill mode latch and a code array disable latch provided in a buffer control element of the computer processor system.

\* \* \* \* \*